UNITED STATES PATENT OFFICE.

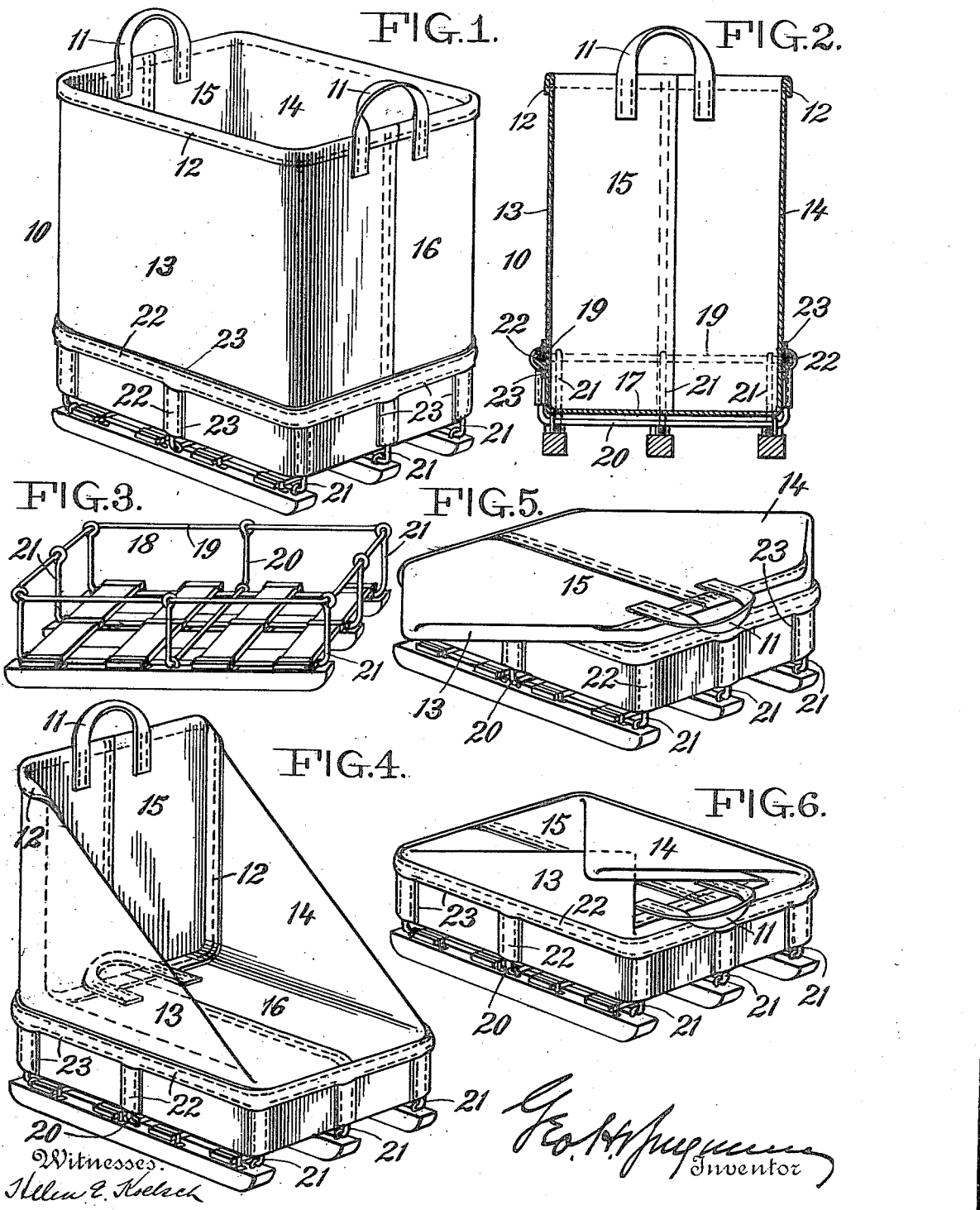

GEORGE HILLARD BENJAMIN, OF NEW YORK, N. Y., ASSIGNOR TO W. T. LANE & BROTHER, OF POUGHKEEPSIE, NEW YORK.

BASKET.

1,148,948.   Specification of Letters Patent.   Patented Aug. 3, 1915.

Application filed May 10, 1912.   Serial No. 696,464.

*To all whom it may concern:*

Be it known that I, GEORGE HILLARD BENJAMIN, a citizen of the United States, residing at New York city, in the county and State of New York, have invented certain new and useful Improvements in Baskets, of which the following is a specification.

This invention relates to baskets of the type comprising a frame and a flexible covering of canvas or other suitable material. Heretofore, in baskets of this type, the frame has been carried to the top of the basket. Such construction is objectionable where the baskets, when not in use, must be stowed in a very small space, as for instance, on shipboard.

My invention has for its object the production of a basket in which the frame will cover the bottom of the basket and but a portion of its height, the remaining portion of the basket being flexible, so that the flexible portion may be folded upon itself and into the frame portion, when the basket is not in use.

The accompanying drawings will serve to illustrate my invention, in which—

Figure 1 is a perspective view of the basket. Fig. 2 is a transverse vertical section. Fig. 3 is a perspective view of the frame separated from the flexible covering. Figs. 4, 5 and 6 are perspective views showing respectively, the position taken by the flexible covering, when the first, second and third fold is made in the covering.

In the drawings, 10 represents the body of the basket, which may be formed of canvas or other suitable material. The canvas may be secured by stitching, rivets, or otherwise, as is usual.

At the top of the basket are handles 11, and around the top of the basket, the canvas is folded over as shown at 12, to form an edge.

As shown in Figs. 1 and 2, the basket is oblong in shape and consists of the side portions 13—14, end portions 15—16, and bottom portion 17. All portions of the basket may be formed of a single layer of canvas or of a plurality of layers of canvas; or the bottom and a portion of the sides may be formed of a thicker canvas, or of canvas having a greater number of woof threads to the inch. I make no claim to any specific construction of the flexible portion of the basket, as such is now well known in the art.

18 indicates the frame portion of the basket, which consists of a horizontally disposed member 19, to which is suitably secured the cross transverse member 20 and longitudinal members 21. The number of cross and longitudinal portions may be varied to suit the shape or use to which the basket is designed to be put. The top member of the frame 18, is arranged approximately about five inches above the bottom of the basket, and the flexible covering secured to the frame in any suitable way. The bottom portion of the basket, it will therefore be seen, is rigid, whereas the upper portion, *i. e.*, that portion extending above the frame, is flexible. The members 19, 20 and 21 are located in pockets 22, formed between the body covering 10 and strips of material 23.

For convenience in stowage, however, the frame should not exceed five inches in height.

To fold the flexible covering into the frame, I first turn the end portion 16 in on the bottom portion 17, as shown in Fig. 4. Then turn the end portion 15 in on top of the end portion 16, as shown in Fig. 5, then turn side portions 13 and 14 inward to overlap the end portions, as shown in Fig. 6. Various other ways (not shown) may be used, for folding in the top and flexible portion of the basket.

Having thus described my invention, what I claim is:

1. A basket comprising a top portion made of flexible material and having its sides and bottom made integral, a bottom portion of the size and shape to inclose the lower part of the upper portion, said bottom portion consisting of a wire frame and having protecting runners on the bottom of said frame, together with means for securing the top and bottom portions together.

2. A basket comprising a flexible portion shaped as a complete bag, the upper portion of which may be folded upon itself, a bottom portion consisting of a rigid frame adapted to inclose and protect the bottom and lower sides of the flexible portion, together with strips of material adapted to cover the top and sides of the rigid frame and secure the rigid frame to the lower part of the flexible portion.

3. A collapsible basket formed of two integral structures connected, one structure a canvas bag, having integral sides and bottom, the other structure a wire frame, said wire frame of such size and height as to inclose the bottom and sides of the bag, together with means for securing such parts together.

4. A basket comprising a supporting frame, said frame consisting of a horizontal member, parallel longitudinal members, and a transverse member, said members connected together; a body of flexible material formed as a complete bag shaped to correspond with that of the interior of the frame, located within the frame but extending above the frame, whereby a flexible portion of the basket is formed which may be folded within the frame, strips of material arranged at the outside of the top, side and end portions of the frame and secured to the body of flexible material, and protecting runners secured to the longitudinal members.

5. A basket comprising a supporting frame, said frame consisting of a horizontal member, parallel longitudinal members, and a transverse member, said members connected together; a body of flexible material formed as a complete bag and shaped to correspond with that of the interior of the frame, located within the frame, having its bottom secured above the bottom members of the frame and its top extending above the frame, whereby the bottom portion is protected from wear and the top portion is made flexible and adapted to be folded within and protected by the frame, strips of material arranged at the outside of the top, side and end portions of the frame and secured to the body of flexible material, and protecting runners secured to the longitudinal members.

6. A basket comprising a supporting frame consisting of a horizontal member, parallel longitudinal members, and a transverse member formed of stout wire and connected together; a body of canvas formed as a complete bag and shaped to correspond with that of the interior of the frame and located within the frame, protecting means covering the outside of the frame and securing the flexible material to the frame, and protecting runners secured to the longitudinal and transverse member.

In testimony whereof, I affix my signature, in the presence of two witnesses.

GEORGE HILLARD BENJAMIN.

Witnesses:
 HELEN E. KOELSCH,
 ELI WEILL.